June 10, 1969   R. S. DETRICK ET AL   3,449,152
METHOD OF RESIN IMPREGNATING A SPOOL OF FIBER GLASS ROVING
Filed June 1, 1965

INVENTORS
ROBERT S. DETRICK &
GERALD J. GILLESPIE
BY
their Attorney

United States Patent Office 3,449,152
Patented June 10, 1969

3,449,152
METHOD OF RESIN IMPREGNATING A
SPOOL OF FIBERGLASS ROVING
Robert S. Detrick, Bethel Park, and Gerald J. Gillespie, Jeannette, Pa., assignors to Koppers Company, Inc., a corporation of Delaware
Filed June 1, 1965, Ser. No. 460,126
Int. Cl. B44d 1/07, 1/092, 1/48
U.S. Cl. 117—54                                    10 Claims

ABSTRACT OF THE DISCLOSURE

A spool of filament reinforcing rovings is placed in a vessel and a vacuum is impressed on the spool to remove air from the interstices of the spool. Then, while the vessel is partially evacuated, liquid hardenable resin enters the vessel and covers the spool. Thereafter, an inert gas is introduced into the vessel to raise the pressure in the vessel in controlled incremental steps until atmospheric pressure is reached whereby the rovings are impregnated with the resin.

---

Figure 1:
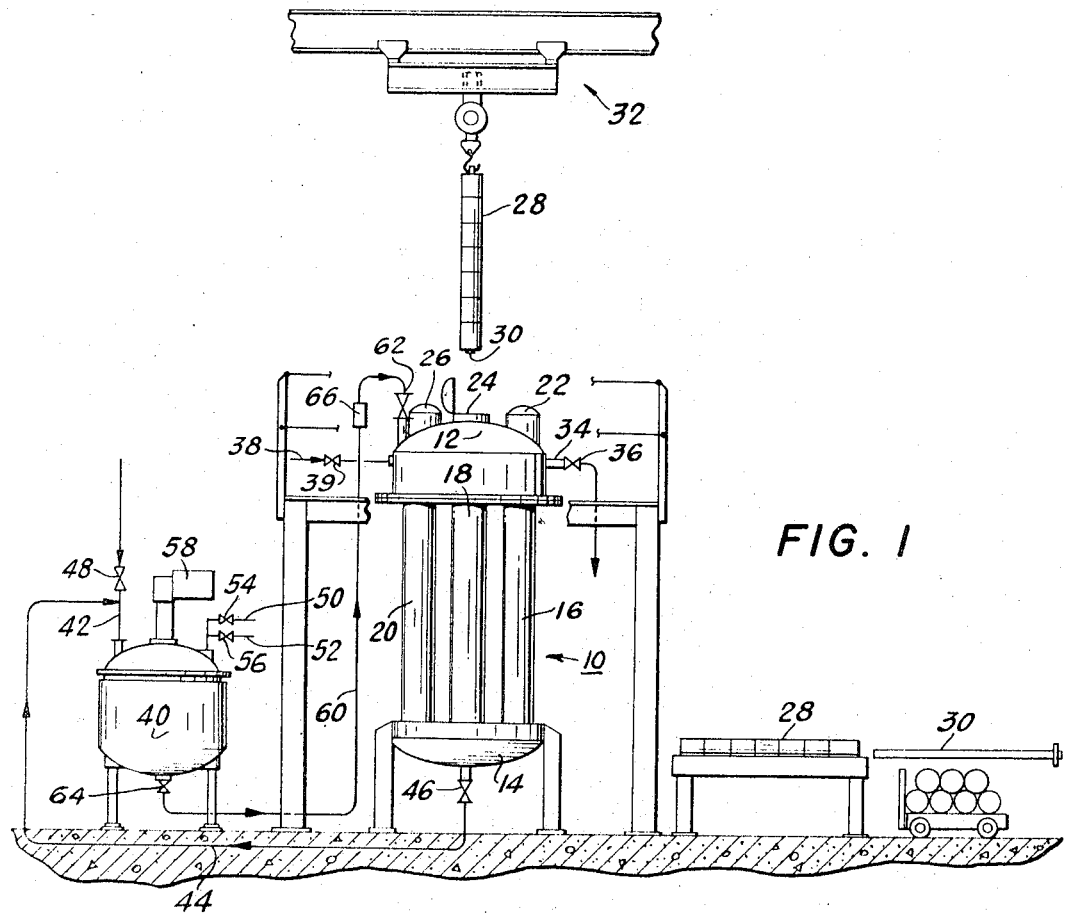

This invention relates to the impregnating of a spool of fibrous material with a liquid and more particularly to the impregnating a spool of fiberglass roving with a liquid resin to produce a spool of impregnated fiberglass roving that is suitable for use in a direct filament winding operation.

Recently a new technique has been developed to fabricate articles such as pressure vessels, fuel tanks and motor cases from fiberglass and a resin. The articles are formed by winding filaments of fiberglass roving impregnated with a resin onto a mandrel to form the laminated article. The articles formed by this new fabrication technique are strong, relatively distortion free and may be subjected to substantial pressures.

One of the limiting factors in expanding this new technique is the process for impregnating the fiberglass roving with the liquid resin before it is wound onto the mandrel to form the laminated article. There are presently known several processes for impregnating the fiberglass roving with the liquid resin. The process most widely used at the present time, referred to as the "wet winding" process, immerses the fiberglass roving as it is unwound from the spool in a bath of liquid resin and immediately thereafter winds the freshly impregnated roving on the mandrel. In the "wet winding" process there is a substantial loss of resin through drippage of excess resin from the fiberglass roving during the winding operation.

Economically, to minimize the time for forming a laminated structure, it is highly desirable to rotate the mandrel at as high a speed as possible while the impregnated fiberglass roving is being wound thereon. Where the roving has an excess of resin thereon, the high angular velocity of the mandrel and the centrifugal forces created thereby throws off the excess resin.

Another process for impregnating the fiberglass roving is referred to as "wet impregnation." In this process the fiberglass roving is unwound from the spool, immersed in a bath of liquid resin and then rewound at a relatively slow speed on another spool. Thereafter, before the resin has cured, the impregnated roving is wound on the mandrel. The "wet impregnation" process is expensive and time consuming in that it requires unwinding the fiberglass roving from the spool, impregnating the roving and again rewinding the roving on another spool for subsequent use in the filament winding operation. The plurality of winding operations required in the "wet impregnation" process causes difficulty at times in the separation of the fibers within the strands that comprise the roving and results in defects in the laminated structure.

The herein described invention eliminates the above problems in impregnating the fiberglass roving with a liquid resin system and provides substantial savings in the amount of resin employed in the filament winding operation and further provides other economic incentives by eliminating the unwinding and rewinding operation as has been the practice in the past with the "wet impregnation" process.

In accordance with the herein described invention the spool of fiberglass roving as received from the manufacturer is impregnated with a liquid resin without unwinding the fiberglass roving from the spool. The spool of impregnated roving then may be used in the direct filament winding operation without further treatment or impregnation.

Briefly, the invention comprises positioning the spool of fiberglass roving as received from the manufacturer in a vessel. The vessel is subjected to a vacuum to thereby evacuate the air entrapped in the spool between the fibers in the strands and the strands forming the fiberglass roving. The spool at the reduced pressure is immersed in a liquid resin system. Thereafter the pressure within the vessel is increased at a controlled rate to permit the liquid resin system to flow into the voids between the strands that comprise the roving so that the spool of fiberglass roving is impregnated with the liquid resin system. The impregnated spool is removed from the vessel and is ready for use in the direct filament winding operation. Where desired, the impregnated spool may be placed in an air-tight container and stored under suitable conditions for a preselected time and thereafter used in the direct filament winding operation.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

In the drawings wherein like parts are marked alike.

Figure 2:
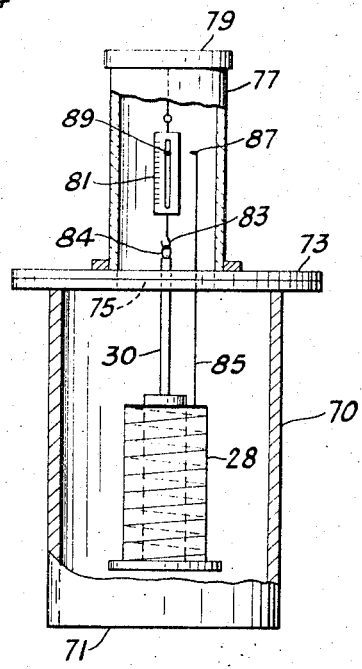

FIGURE 1 is a semidiagrammatic view of an embodiment of apparatus for carrying out the invention, and FIGURE 2 is a device usable with the apparatus of FIG. 1 for determining the rate of increase of pressure.

Fiberglass roving comprises a plurality of gathered fiberglass strands. The fiberglass strands each have a plurality of fine fiberglass filaments formed by attenuating a molten glass stream. In practice a plurality of molten glass streams are wound on a tube at a high speed so that the flowing streams of molten glass are drawn as very fine fibers. Each of the flowing streams is continuously attenuated into a fine glass fiber and the strands formed by a plurality of these fine glass fibers are produced in unlimited lengths. A size or binder such as a starch or a silane or epoxy resin is applied to the strand as the individual fibers are gathered to preserve the integrity of the strand and to prevent separation of the fine filaments or fibers during later processing operations. The single filaments or fibers in the strand may number from 100 to 200 and each filament has a diameter within the range of .0001" to .0006", with an average diameter of about .0003".

A number of the strands so processed are wound onto a spool under even tension. The void space between the strands within the roving and the wound layers of roving is usually evenly distributed throughout the spool. The number of strands gathered into a roving varies between about 1 and 120 strands and is usually designated by the number of ends in the roving. For example, a 60 end roving has 60 strands, each strand having between 100 and 200 fine glass fibers or filaments.

The roving is wound onto fiber tubes having an outer diameter of about 3″ to 3¼″ and a length of approximately 10″. The spools are classified by the weight content of the fiberglass roving wound thereon. For example, a 15 pound spool designates a spool having 15 pounds of fiberglass roving wound thereon and, where a 3″ fiber tube is employed, usually having a diameter of 7″ and a length of approximately 10″. The commercially available spools range in weight from about 10 pounds to 17 pounds and have between 40 to 60% void space. The void space within the spool may be calculated from the weight and dimensions of the spool and the density of the glass filaments. Larger spools, that is, spools having a 10″ outer diameter and about 35 pounds of fiberglass roving wound thereon are also available.

The term liquid resin system as used herein is intended to designate any resin system that is a liquid and has a reasonable viscosity and pot or useful life. Resin systems that include epoxy, furane, polyester, phenolic, silicone, and phenyl silane resins are suitable for use in this process. Such resins are widely employed in the making of laminated fiberglass resin articles by the direct winding operation, and are commercially available under various tradenames. For example, Tonox is a trademark for crude 4,4′-methylenedianiline. Tonox curing agent has an equivalent weight of 52.2 whereas pure 4,4′-methylenedianiline has an equivalent weight of 49.5. When by weight 4 parts of Tonox curing agent is diluted with 1 part of dimethylformamide and 35 parts of this mixture is mixed with 100 parts of Araldite 6005 (an epoxy resin produced by the reaction of bisphenol-A with epichlorohydrin) it has the following viscosity characteristics.

| Time, hrs.: | Viscosity, cps., 73° F. |
| --- | --- |
| Initial | 2,400 |
| 4 | 4,000 |
| 20 | 7,000 |
| 27 | 10,800 |

The initial viscosity of this resin system is low enough and the pot life long enough for spool impregnation, in accordance with this invention, and subsequent use of the spool. The useful life of the product of the invention, the resin impregnated spool, can be further increased by storing the spools at lower than room temperature, i.e., 45° F. or lower.

Shell Chemical Company sells a boron triflouride-amine complex that is a latent or semilatent catalyst under the tradename "BF$_3$–400." Usually 1 to 5 parts of this catalyst are used per 100 parts by weight of the epoxy resin.

Some typical polyester resin systems available under commercial tradenames for spool impregnation and their viscosities are:

| Polyester blend | Wt. ratio | Benzoyl peroxide, wt. percent | Methyl ethyl ketone peroxide, wt. percent | 25° C. days | Brookfield viscosity, cps., 25° C. |
| --- | --- | --- | --- | --- | --- |
| Koplac 3300–5/Atlac 387–03. | 70/30 | 1.0 | 0.06 | Initial<br>3<br>7 | 350<br>410<br>500 |
| Do | 70/30 | 1.0 | 0.15 | Initial<br>3<br>7 | 350<br>415<br>500 |
| Plaskon 9600/ Plaskon 941. | 55/45 | 1.0 | 0.0 | Initial<br>4<br>7 | 865<br>930<br>990 |

KOPLAC 3300–5 is an unsaturated polyester derived from hydrogenated bisphenol-A and fumaric acid diluted to 50% solids with styrene monomer and is marketed by Koppers Company, Inc., under the trademark, KOPLAC 3300–5.
ATLAC 387–03 is an unsaturated polyester resin that is covered by U.S. Patent 3,214,491; it is used to modify the physical properties of a polyester resin, in this instance, the resin KOPLAC 3300–5.
PLASKON 941 is a general purpose resin derived from phthalic anhydride, maleic anhydride, and propylene glycol, diluted to about 70% solids with styrene monomer.
PLASKON 9600 is similar to PLASKON 941 except that some of the propylene glycol is replaced with dipropylene glycol to impart flexibility.

A furane thermosetting resin, for example, sold under the tradename Lamojet-Type X–2 has a viscosity of 300 cps. at 27° C. and when catalyzed with 1% zinc chloride is a suitable resin system for glass spool impregnation.

The preferred liquid resin system that has the desirable viscosity for impregnating spools of fiberglass roving according to the hereinafter described process is a liquid epoxy resin with a latent or semilatent catalyst and a curing agent. For example, suitable resin system comprises 100 parts by weight of diglycidyl ether of bisphenol such as, for example, sold under the trademark Araldite 6005, 90 parts by weight of hexahydrophthalic anhydride, and 0.25 part by weight benzyldimethylamine. The epoxy resin system has an initial viscosity of about 900 cps. at 25° C. This viscosity increases with time. Other curing agents, of course, may be employed. For example, in lieu of the hexahydrophthalic anhydride curing agent Nadic® (methylbicyclo(2.2.1)heptene-2,3-dicarboxylic anhydride isomers) may be used. Other catalysts as is well known in the art may also be used in place of benzyldimethylamine.

Referring to FIG. 1, there is illustrated an impregnating vessel 10 that has a top chamber 12 and a bottom chamber 14. Extending between the chambers 12 and 14 are a plurality of tubular vertical cylindrical chambers 16, 18 and 20. The chambers 16, 18 and 20 are connected with the upper and lower chambers 12 and 14 and have openings that communicate with the internal portion of the respective upper and lower chambers. The upper chamber 12 has receivers 22, 24, and 26 that are aligned with the vertical chambers 16, 18 and 20 and provide a means for inserting spools of fiberglass roving into the respective vertical chambers 16, 18 and 20. The receivers 22, 24 and 26 are provided with suitable closure members to seal the openings therein during the impregnation process.

A plurality of spools of fiberglass roving designated by the numeral 28 are secured on a carrier pipe 30 in endwise relation and are inserted through the respective receivers into the vertical chambers 16, 18 and 20 by means of an overhead hoist 32. After the plurality of spools 28 are positioned within the vertical chambers, the closure members are fastened to provide an air-tight impregnating vessel 10. The upper chamber 12 has a conduit 34 connected to a vacuum pump (not shown). A valve 36 is positioned in the conduit 34. The chamber 12 has a second conduit 38 extending therefrom that is connected to a source of inert gas such as nitrogen or the like. A valve 39 is positioned in conduit 38 to control the flow of inert gas into the upper chamber 12. A suitable control means is provided to regulate valve 39 and control the rate at which the pressure within the impregnating vessel 10 is increased by the flow of gas through conduit 38.

A resin mix tank 40 is positioned adjacent to the impregnating vessel 10 and has an inlet conduit 42 through which the resin system, i.e., the resin, anhydride and catalyst are supplied to the tank 40. A conduit 44 connected at one end to the impregnating vessel lower chamber 14 and at the other end to the conduit 42 is arranged to return excess resin from the impregnating vessel 10 to the resin tank 40. Conduits 44 and 42 have control valves 46 and 48 therein. Conduits 50 and 52 with valves 54 and 56 therein are connected to the resin mix tank 40. Conduit 50 is connected to a vacuum pump and conduit 52 is connected to a suitable source of gas such as nitrogen, dry air or the like. A mixer 58 is provided in the resin mix tank to admix the constituents of the resin system supplied thereto through conduit 42. A conduit 60 is connected at one end to the bottom of resin tank 40 and at the other end to the impregnating vessel upper chamber 12 with valves 62 and 64 therein adjacent the impregnating vessel 10 and the resin mix tank 40. A sight glass 66 is positioned in the conduit 60 at an elevation above the top of the impregnating vessel top chamber 12.

The process for impregnating the spools of fiberglass roving may be practiced as follows with the apparatus previously described. The valves 54, and 56 in conduits 50 and 52 are closed, valve 64 is closed and valve 48 is opened. The resin system constituents, i.e., resin, curing agent and catalyst are supplied to the mix tank 40 through conduit 42 and are blended in mix tank 40 by mixer 58. The valve 54 in conduit 50 is opened and the blended resin system within resin tank 40 is subjected to a vacuum and deaerated.

Valves 36, 39, 62 and 46 associated with the impregnating vessel are closed. The receivers 22, 24 and 26 are opened and spools positioned on pipe 30 are inserted into the respective vertical chambers 16, 18 and 20 by means of the overhead hoist 32. The receivers 22, 24 and 26 are closed and valve 36 is opened and the impregnating vessel 10 is subjected to a vacuum until the pressure within the impregnating vessel 10 is below about 20 mm. Hg (absolute). After the reduced pressure has been attained the valves 62 and 64 are opened and the resin system is transferred from the mixing tank 40 to the impregnating vessel by closing valve 54 in vacuum conduit 50 and opening valve 56 in the gas conduit 52 to increase the pressure within the mix tank 40 to atmospheric pressure with a gas such as nitrogen or dry air.

A sufficient amount of the resin system is transferred to the impregnating vessel 10 to completely immerse the spools of fiberglass roving within the vertical chambers 16, 18 and 20 and also to provide a sufficient excess of the resin system within the impregnating vessel 10 so that the spools of roving remain completely immersed in the liquid resin system during the impregnating process. The amount of resin required to impregnate the spools of roving may be calculated by the amount of void space in each of the spools of fiberglass roving. For example, where there are seven vertical chambers in the impregnating vessel, each containing seven spools, approximately 150 gallons of the resin system should be charged to the impregnating vessel 10. The sight glass 66 in conduit 60 is used to determine when all of the resin has been transferred from the resin tank 40 to the impregnating vessel 10. As the last of the resin system flows through the sight glass 66, the valve 62 is closed.

After the impregnating vessel 10 is charged with the liquid resin system at the reduced pressure, the valve 36 is closed and the valve 39 is opened to permit nitrogen or other inert gas to flow into the impregnating vessel 10 and increase the pressure within the impregnating vessel from the reduced pressure below 20 mm. Hg (absolute) to atmospheric pressure and permit the resin to flow into the void spaces in the spools of fiberglass roving. The increase in pressure is carefully controlled by a time schedule pressure controller instrument which maintains the desired pressure time schedule during the impregnating cycle so that the spools of fiberglass roving do not collapse during the impregnation cycle and the resin system penetrates the entire spool.

At the end of the impregnating cycle the valve 46 in conduit 44 connecting the bottom of impregnating vessel 10 and the resin tank 40 is opened and the resin tank 40 is subjected to a vacuum to transfer the unused resin from the impregnating vessel 10 to the mixing tank 40. The impregnated spool assemblies are removed from the impregnating vessel 10 by the hoist 32 and are positioned on a suitable stand where the carrier pipe is removed therefrom. The spools may thereafter be wiped free of excess resin and packaged in suitable containers for storage or may be used directly in the direct filament winding operation. It should be understood that modifications may be made in the previously disclosed apparatus without departing from the scope of the invention herein described.

The following examples are illustrative of the conditions under which spools of fiberglass roving may be impregnated with a resin according to the previously described process.

EXAMPLE I

A spool of fiberglass roving manufactured by Owens Corning Fiberglas and approximately 50 percent void space between the strands wound on the spool. The 60 end roving was wound on the spool in a 2½ interlocking way wind, and had G (average 0.00035 inch diameter) fibers with a silane finish. The spool had about 15 pounds of fiberglass roving wound thereon. The spool was positioned in an impregnating vessel and the vessel was subjected to a vacuum until a reduced pressure within the impregnating vessel of about 1 mm. Hg (absolute) was attained. A liquid epoxy resin system having a viscosity of 1,000 cps. and comprising by weight 100 parts digylcidyl ether of bisphenol (Araldite 6005), 90 parts hexahydrophthalic anhydride and .25 part benzyldimethylamine was deaerated and then drawn into the impregnating vessel to completely immerse the spool. The impregnating vessel was maintained at the reduced pressure of about 1 mm. Hg (absolute) while the spool was immersed in the resin system.

After the spool was immersed in the resin system, the impregnation cycle was commenced by increasing the pressure within the impregnating vessel at a controlled rate to force the resin system into the void spaces in the spool. The time required to increase the pressure within the impregnating vessel from about 1 mm. Hg (absolute) to atmospheric pressure was about 108 minutes. The pressure within the impregnating vessel was increased in stages and maintained at preselected intermediate pressures while the resin was flowing into the void space within the spool of fiberglass roving. The pressure within the impregnating vessel was increased from 1 mm. Hg (absolute) to 3 p.s.i. (absolute) in 5 minutes, and thereafter increased to 6 p.s.i. (absolute) in 3 minutes. The impregnating vessel was held at a pressure of 6 p.s.i. (absolute) for a period of 80 minutes and thereafter raised to 7 p.s.i. (absolute) over a period of 15 minutes. The impregnating vessel was held at a pressure of 7 p.s.i. (absolute) for a period of 5 minutes and thereafter was increased to atmospheric pressure to complete the impregnating cycle. The spool of impregnated fiberglass roving was weighed and by the difference in weight it was determined that the 50 percent void space previously present in the spool of fiberglass roving was filled with the liquid resin system.

EXAMPLE II

The process of Example I was repeated except that the pressure within the impregnation vessel was not held at 6 p.s.i.i for an extended period. The spool of fiberglas roving collapsed and impregnation was incomplete.

EXAMPLE III

The process of Example I was repeated except that the spool of fiberglass roving within the impregnat- vessel was subjected to a reduced pressure of 5 mm. Hg (absolute) and immersed in the liquid resin system. The time required to complete the impregnation cycle and force the resin system into the void space within the spool increased to 2 hours and 20 minutes. The spool, however, was completely impregnated with the resin system.

EXAMPLE IV

The process of Example I was repeated except that the spool of fiber fiberglass roving within the impregnating vessel was subjected to a reduced pressure of 20 mm. Hg (absolute) and immersed in the liquid resin system. The time required to complete the impregnation cycle was increased to about 5 hours. The spool absorbed the expected weight of resin, but a thin layer of roving near the center of the spool contained less resin than desired, i.e., the thin layer contained 19 percent resin as compared with 29 percent resin in the remainder of the impregnated spool. The spool of resin impregnated fiberglass roving was, however, suitable for certain direct filament winding operations.

EXAMPLE V

The process of Example I was repeated and the period at which the spool of fiberglass roving was held at the initial vacuum or reduced pressure before immersion in the liquid resin system was varied between 3 minutes and 30 minutes. There was no noticeable difference in the spools of resin impregnated fiberglass roving.

EXAMPLE VI

A series of spools were impregnated in accordance with Example I, and the spools were then individually packaged to eliminate as far as possible the adverse effects of moisture absorption in converting the acid anhydride curing agent (hexahydrophthalic anhydride) to the free acid, each impregnated spool was placed in a double-wall polyethylene bag made of polyethylene film of about 3 mils thickness. In the annular space between the walls of the bag, there was placed about 1 pound of Drierite (calcium sulfate) as a desiccant. The spools so packaged were shipped by express from Pittsburgh, Pa. to Farmingdale, N.Y., where, without further processing, the roving was wound in a known fashion to produce fiberglass, reinforced epoxy pipe of the type sold, for example, under the trademark Hystran.

It was found that when the bags were maintained at room temperature the roving of the spools could be wound into pipe at any time over a period of one week before the viscosity of the liquid resin system became so high as to render the production capable of such pipe unfeasible with presently known equipment where winding is difficult if the viscosity rises above 10,000 cps. On the other hand, it was found that by maintaining the spools under refrigeration whereby the temperature was maintained below 40° F., the change in viscosity of the liquid resin system was so slow that the spools could be used at any time within a month.

EXAMPLE VII

A series of spools of fiberglass roving having 35 pounds of fiberglass roving wound thereon and a void space of 49% was impregnated in accordance with the general procedure of Example I. Although a resin system of the composition described in Example I was used, the viscosity of the liquid was 1,200 cps. The spool was placed in the impregating vessel and the pressure reduced to one millimeter of mercury. Thereafter the liquid resin system was drawn into the vessel and the pressure increased to atmospheric as follows. The pressure was increased from one millimeter of mercury to 3 pounds per square inch (absolute) over a period of 36 minutes. Then the pressure was increased from 3 pounds per square inch to 6 pounds per square inch (absolute) over a period of another 36 minutes, and this pressure was maintained for 30 minutes. Thereafter, the pressure was increased from 6 to 7½ pounds per square inch (absolute) over a period of 10 minutes and this pressure was maintained for 20 minutes. Then the pressure was raised to atmospheric pressure over a period of 49 minutes. A spool was removed at this time, weighed and found to be 81% saturated. The remaining spools were permitted to stand at atmospheric pressure for 5.75 hours at the end of which time, the spools were weighed and found to be 100% saturated.

Other resin systems were used and similar results were obtained. The viscosity of the resin varied from about 900 cps. to as high as 9,000 cps. and impregnation of spools of fiberglass roving was accomplished with the resins at the different viscosities. At the higher viscosities, however, it was observed that longer periods of time are required to completely impregnate the spools of fiberglass roving.

It should be appreciated from the above examples that it is possible to vary the operating conditions of the process and obtain suitably impregnated spools of fiberglass roving. It is believed that one of the critical features of the process is the controlled rate at which the pressure within the impregnating vessel is increased from the reduced pressure to atmospheric pressure while the void spaces within the spool of fiberglass roving are being filled with the liquid resin system. It has been found that a rate of change in pressure of 0.5 pound per square inch per minute is suitable and a holding period of between about 80 and 90 minutes at an intermediate pressure of 6 pounds per square inch (absolute) is satisfactory for spools having about 15 pounds of fiberglass roving wound thereon. The holding period and rate of pressure change may vary with the size of the spool, the type of glass on the spool, the manner in which the roving is wound on the spool, the tension of the roving as it is wound on the spool, and the amount of roving wound on each spool. The above discussed rate of pressure change and holding period may be varied within limits as required by the particular spool of fiberglass roving without departing from the scope of the invention.

FIG. 2 illustrates a convenient device for determining the correct rate for the increase of pressure on the spool to impregnate the spool with a liquid resin system in accordance with this invention. The device comprises generally a cylinder 70 which is open at end 71 and at the other end closed by a flange 73. An elongated hollow glass column 77 fits over and seals an aperture 75 in flange 73. Glass column 77 is closed by a cap 79 that supports a weighing scale 81 which may be a conventional spring scale. A hook 83 on scale 81 is adapted for engagement with the eye 84 of pipe 30.

In operation, a spool 28 is placed on pipe 30 and the pipe suspended from scale 81. Fastened to the top layer of windings of spool 28 is a wire 85. An indicator 87 is positioned on the wire to coincide and oppose the indicator 89 on scale 81. This unit is then placed in one of the receivers 22, 24 and 26. Thereafter the general impregnation procedure described in Example I is carried out.

So long as the pressure is being increased on the impregnating fluid at such a rate as to not collapse the spool, indicators 87 and 89 remain in the same plane. Although the weight of the spool changes, the windings of spool 28 maintain their original configuration, and there is no relative movement between indicators 87, 89. If the pressure be increased at a greater rate than the unimpregnated portion of the spool can withstand, the spool collapses. In this event, the longitudinal dimension of the spool decreases, and a relative movement occurs between indicator 87 on wire 85 and indicator 89.

With the foregoing arrangement, optimum rate of increase of pressure can be readily determined for any uniform set of spools.

From the above, it will be apparent that it is now possible to rapidly impregnate spools of fiberglass roving with various liquid resin systems for use in the direct filament winding operation.

We claim:
1. A method of impregnating a spool of fiberglass roving with a liquid resin comprising:
 (a) positioning said spool of fiberglass roving in a vessel,
 (b) reducing the pressure within said vessel to a first preselected reduced pressure,
 (c) immersing said spool of fiberglass roving in a bath of said liquid resin in said vessel while said vessel is maintained at said first preselected reduced pressure,
 (d) increasing the pressure within said vessel at a controlled rate to a second preselected reduced pressure below atmospheric pressure and above said first preselected reduced pressure,
 (e) maintaining said vessel at said second preselected pressure until said spool of fiberglass roving is substantially impregnated with said liquid resin,
 (f) thereafter increasing the pressure within said vessel from said second preselected pressure to atmospheric pressure at a controlled rate, and (g) removing said spool of fiberglass roving from said vessel.

2. A method of impregnating a spool of fiberglass roving with a liquid resin as set forth in claim 1 in which: the pressure within said vessel is reduced to a first preselected reduced pressure below about 20 mm. Hg (absolute).

3. A method of impregnating a spool of fiberglass roving with a liquid resin as set forth in claim 1 in which: said pressure within said vessel is increased from said first preselected reduced pressure to said second preselected reduced pressure at a rate of about 0.5 pound per minute.

4. A method of impregnating a spool of fiberglass roving with a liquid resin as set forth in claim 1 in which: the pressure within said vessel is increased at a controlled rate to a second preselected pressure of about 6 pounds per square inch (absolute).

5. A method of impregnating a spool of fiberglass roving with a liquid resin as set forth in claim 1 in which: the vessel is maintained at said second preselected pressure for at least about one hour.

6. A method of impregnating a spool of fiberglass roving with a liquid resin as set forth in claim 1 in which: said liquid resin comprises,
about 100 parts by weight diglycidyl ether bisphenol,
about 90 parts by weight hexahydrophthalic anhydride, and
about .25 part by weight benzyldimethylamine.

7. A method of impregnating a spool of fiberglass roving with a liquid resin as set forth in claim 1 in which: said liquid resin has a viscosity of above about 800 centipoises at 25° C.

8. A method of impregnating a spool of fiberglass roving with a liquid resin comprising:
positioning the spool of fiberglass roving in a vessel,
reducing the pressure within said vessel to a pressure of about 1 mm. Hg (absolute),
immersing the spool of fiberglass roving in a bath of said liquid resin in said vessel while said vessel is maintained at said reduced pressure of 1 mm. Hg. (absolute),
increasing the pressure within said vessel at a rate of about 0.5 pound per minute to a second reduced pressure of about 6 pounds per square inch (absolute),
maintaining said vessel at said second reduced pressure of about 6 pounds per square inch for a period of at least about one hour,
thereafter increasing the pressure within said vessel from said second reduced pressure of 6 pounds per square inch (absolute) to atmospheric pressure at a controlled rate of about 0.5 pound per minute, and
removing said spool of fiberglass roving from said vessel.

9. A method of impregnating spools of fiberglass roving with a liquid resin system comprising:
positioning said spools of fiberglass roving in an impregnating vessel,
reducing the pressure within said impregnating vessel to a first preselected reduced pressure,
feeding liquid resin system constituents comprising a liquid resin, a curing agent and a catalyst to a mix tank,
admixing said resin constituents in said mix tank to form a liquid resin system,
subjecting said mix tank to a vacuum to deaerate said liquid resin system,
transferring a sufficient quantity of said deaerated resin system to said impregnating vessel to immerse said spools of fiberglass roving in said impregnating vessel therein while said impregnating vessel is maintained at said first preselected reduced pressure,
increasing the pressure within said impregnating vessel at a controlled rate to a second preselected reduced pressure below atmospheric pressure and above said first preselected pressure until the fiberglass roving within said impregnating vessel is substantially impregnated with said liquid resin system,
thereafter increasing the pressure within said impregnating vessel from said second preselected pressure to atmospheric pressure at a controlled rate, and
removing said spools of fiberglass roving from said vessel.

10. A method of impregnating spools of fiberglass roving with a liquid resin system comprising:
positioning said spools of fiberglass roving in an impregnating vessel,
reducing the pressure within said vessel to a pressure of about 1 mm. Hg (absolute),
feeding liquid resin system constituents comprising a liquid resin, a curing agent, and a catalyst to a mix tank,
admixing said resin constituents in said mix tank to form a liquid resin system having a viscosity above 800 centipoises at 25° C.,
subjecting said mix tank to a vacuum to deareate said liquid resin,
connecting said mix tank to said impregnating vessel,
supplying an anhydrous gas to said mix tank to increase the pressure therein and transfer a sufficient quantity of said deareated resin to said impregnating vessel to immerse said spools of fiberglass roving in said impregnating vessel therein while said impregnating vessel is maintained at a pressure of about 1 mm. Hg (absolute),
supplying an inert gas to said impregnating vessel at a controlled rate at a location above the level of the deareated resin system in said impregnating vessel to increase the pressure within said impregnating vessel at a rate of 0.5 pound per minute to a second reduced pressure of about 6 pounds per square inch (absolute),
maintaining said vessel at said second reduced pressure of about 6 pounds per square inch (absolute) for a period of at least about one hour,
thereafter supplying inert gas to said impregnating vessel at a location above the level of said liquid resin system at a controlled rate of about 0.5 pound per minute to increase the pressure within said impregnating vessel from said second reduced pressure of 6 pounds per square inch (absolute) to atmospheric pressure,
transferring the liquid resin system remaining in said impregnating vessel from said impregnating vessel to said mix tank, and
removing said spools of fiberglass roving from said impregnating vessel.

References Cited

UNITED STATES PATENTS

| | | | |
|---|---|---|---|
| 3,071,496 | 1/1963 | Fromm et al. | 117—119 XR |
| 2,912,382 | 11/1959 | Liao et al. | 117—61 XR |
| 2,524,885 | 10/1950 | Clokey | 117—119 XR |
| 3,290,197 | 12/1966 | Carmody | 156—175 XR |
| 3,384,505 | 5/1968 | Palmer et al. | 117—61 XR |

PHILIP DIER, *Primary Examiner.*

U.S. Cl. X.R.

117—113, 119, 126, 161; 156—175